United States Patent
Laukemann et al.

(10) Patent No.: US 7,684,947 B2
(45) Date of Patent: Mar. 23, 2010

(54) METHOD FOR MATCHING THE ACTUAL CHARACTERISTIC CURVE OF A HYDRODYNAMIC COMPONENT TO A PREDEFINED SET CHARACTERISTICS CURVE DURING THE FINAL TEST OF THE HYDRODYNAMIC COMPONENT

(75) Inventors: Dieter Laukemann, Vellberg (DE); Markus Kley, Ellwangen (DE); Martin Becke, Ulm (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 180 days.

(21) Appl. No.: 11/664,447

(22) PCT Filed: Sep. 30, 2005

(86) PCT No.: PCT/EP2005/010562

§ 371 (c)(1),
(2), (4) Date: Oct. 18, 2007

(87) PCT Pub. No.: WO2006/037562

PCT Pub. Date: Apr. 13, 2006

(65) Prior Publication Data

US 2008/0159880 A1    Jul. 3, 2008

(30) Foreign Application Priority Data

Oct. 2, 2004 (DE) .................. 10 2004 048 121

(51) Int. Cl.
*G06F 11/22* (2006.01)
(52) U.S. Cl. .................................................. 702/105
(58) Field of Classification Search ................. 702/105, 702/41, 43, 44, 64, 65, 71, 108, 113–115, 702/138; 701/78, 83; 73/788, 798
See application file for complete search history.

(56) References Cited

U.S. PATENT DOCUMENTS 4,459,085 A    7/1984    Tonegawa .................. 417/282

(Continued)

FOREIGN PATENT DOCUMENTS

DE    33 35 259 A1    4/1985

(Continued)

*Primary Examiner*—Michael P. Nghiem
*Assistant Examiner*—Cindy H Khuu
(74) *Attorney, Agent, or Firm*—Ohlandt, Greeley, Ruggiero & Perle, L.L.P.

(57) ABSTRACT

A method for matching an actual characteristic curve or diagram that characterizes the operating mode of a hydrodynamic component to a set characteristic curve or diagram is provided. The method includes a set characteristic curve or diagram of the hydrodynamic component is stored in a writable/readable memory storage unit a set manipulated variable being assigned to each operating point; the current actual characteristic curve is determined from the operating parameters that characterize the individual operating states and, for each operating point, is compared with the given set characteristic curve or diagram, a correction of the set manipulated variable being carried out for the respective operating point in the event of a deviation beyond a preset range of tolerances; and, in the event a deviation does not occur, the current set value is set as the new set value and read into the memory storage unit as a set manipulated variable.

11 Claims, 5 Drawing Sheets

U.S. PATENT DOCUMENTS

| | | | | |
|---|---|---|---|---|
| 5,496,096 A | * | 3/1996 | Petersen et al. | 303/3 |
| 5,732,377 A | * | 3/1998 | Eckert | 701/83 |
| 5,735,584 A | * | 4/1998 | Eckert | 303/140 |
| 5,871,419 A | * | 2/1999 | Amendt | 477/180 |
| 6,001,044 A | * | 12/1999 | Amendt | 477/180 |
| 6,036,449 A | | 3/2000 | Nishar et al. | 417/292 |
| 6,375,233 B1 | * | 4/2002 | Friedmann et al. | 285/272 |
| 7,044,046 B2 | * | 5/2006 | Wietzel et al. | 91/368 |
| 2007/0112537 A1 | * | 5/2007 | Gronau et al. | 702/105 |

FOREIGN PATENT DOCUMENTS

| | | |
|---|---|---|
| DE | 37 08 679 A1 | 10/1988 |
| DE | 196 45 443 A1 | 5/1998 |
| DE | 197 51 776 A1 | 5/1999 |
| DE | 196 45 443 C2 | 12/1999 |
| DE | 198 57 535 A1 | 6/2000 |
| EP | 0 176 750 A1 | 8/1985 |
| EP | 1 437 520 A2 | 12/2003 |
| GB | 775525 A | 5/1957 |
| WO | WO 00/55520 A | 9/2000 |

* cited by examiner

METHOD FOR MATCHING THE ACTUAL CHARACTERISTIC CURVE OF A HYDRODYNAMIC COMPONENT TO A PREDEFINED SET CHARACTERISTICS CURVE DURING THE FINAL TEST OF THE HYDRODYNAMIC COMPONENT

CROSS REFERENCE TO RELATED APPLICATIONS

Not applicable

BACKGROUND OF THE INVENTION

1. Field of the Invention

The invention relates to a method for matching an actual characteristic curve or an actual characteristic diagram that characterizes the operating mode of a hydrodynamic component to a set characteristic curve or a set characteristic diagram that has been pre-defined or can be given in advance during the final test of the hydrodynamic component.

2. Description of Related Art

As a rule, hydrodynamic components are subjected to a final test during fabrication, in which, on the test stand, the characteristic diagram adjustable with it is measured and is stored as a fixed characteristic curve. During this process, as a rule, a predetermined set value is established by customer specification and all hydrodynamic components of the same design type should lie in a certain tolerance band within these set value specifications. The actual values that have been currently attained with the hydrodynamic component are measured and stored as a characteristic curve. In the event of very strong deviations between the attained actual values and the desired set values, structural measures for subsequent processing are implemented; for a hydrodynamic retarder, for example, these may involve an enlargement of the outlet bore. However, through the predetermination of the tolerance band, it is often the case that the theoretical braking power that is fully available is not at all exhausted. Accordingly, in the case of hydrodynamic retarders of the same type, the same actuation results in different braking torques being attainable.

In order to compensate for ageing effects in fabrication spreads, it has been known—for example, for optimizing the shifting operation in vehicle transmissions, particularly automatic transmissions of vehicles—to design these transmissions with an adaptive control. Here, electrohydraulically actuated friction elements bring about the shifting between the various gear-ratio steps. An actual variable that characterizes the shifting operation (preferably the slip time, the shifting time, or the rpm gradient during the slip time) is compared with a stored set variable and, when a pre-given deviation is exceeded, a correction value is stored. The latter then acts during subsequent shifting operations in a corrective manner in terms of an adaptive control on the creation of a control variable for the friction elements, preferably the hydraulic pressure. This process is characterized in that the adaptive control occurs only during operation and thus an adjustment is possible only after a certain operating time.

Previously known from EP 1 437 520 A2 for hydrodynamic components in the form of hydrodynamic couplings is a method for controlling an automatically actuated coupling, in which the torque that is to be transmitted is controlled according to a coupling characteristic curve as a function of the coupling position and the coupling characteristic curve is corrected so as to compensate for changes in the coupling behavior. The coupling characteristic curve is adapted to this end, for which purpose a minimally allowable characteristic curve and a maximally allowable characteristic curve are generated and the valid coupling characteristic curve in the form of an interpolated characteristic curve, which is adapted to the coupling behavior according to the control variables, is calculated by interpolation between the values of the minimal characteristic curve and those of the maximal characteristic curve. This kind of regulation results in a response to changes in the coupling properties due to various influencing factors.

Methods for controlling hydrodynamic components during operation have been further previously known from DE 106 45 443 C2 and DE 33 35 259. In these designs, the matching of the actual value to the set value occurs through regulation during operation.

BRIEF SUMMARY OF THE INVENTION

The invention is therefore based on the problem of developing a method for matching an actual characteristic curve or the actual characteristic diagram that characterizes the operating mode of a hydrodynamic component to a set characteristic diagram in such a way that the spreads with respect to a desired set characteristic curve or a desired set characteristic diagram are minimized without the necessity of structural changes.

In accordance with the invention, the spreads due to tolerances in the characteristic curves or else characteristic diagrams that can be attained by means of the hydrodynamic components, the actual characteristic curve or else the actual characteristic diagram, which contain variables that characterize at least indirectly the operating mode of the hydrodynamic components, are matched to a set characteristic curve or a set characteristic diagram during the final testing in such a way that they lie at least in the tolerance range of the set characteristic curve or the set characteristic diagram of the variables of the hydrodynamic components that describe at least indirectly the operating mode of the hydrodynamic components and they preferably correspond directly to the latter. This problem is solved in that, during a final test, the actual characteristic curve or the actual characteristic diagram that results currently with the hydrodynamic components when preferably the entire operating range is run through is determined with different operating requirements and is compared with the corresponding operating points of the set characteristic curve or of the set characteristic diagram and, in the event of a deviation, the manipulated variable for adjusting the parameter characterizing the operating mode is changed, the change occurring in such a manner that, during the next adjustment of the corresponding operating point, a matching or an approximation to the pre-given or predefined set value according to the set characteristic curve or the set characteristic diagram occurs taking into consideration a tolerance range. If this state is reached—that is, the actual value currently attained during a further run lies at least in the tolerance range of the desired set value or else corresponds to it—then the manipulated variable is set as a predetermined value, that is, as a set manipulated variable, for the adjustment of this specific operating point and is stored as a manipulated variable for attaining this operating point.

The inventive solution makes it possible, also for larger component part tolerances between hydrodynamic components of the same type, to adjust essentially identical characteristic curves that characterize the operating mode and thus to transmit or to produce identical torques. This is accomplished in a simple manner through the corresponding calibration of the characteristic diagram, in particular of the manipulated variable characteristic diagram—that is, the manipulated variables for attaining an operating point are matched for a hydrodynamic component. Achieved in this way is an improvement in the matching between the control variable and the output variable. The new set manipulated variables are then stored for the individual operating points in the form of a corresponding characteristic curve in a writable/readable memory storage unit and form the basis for the actuation during adjustment of an operating point for the later operation of the hydrodynamic component in the applied case. The characteristic diagram thus obtained is assigned to the hydrodynamic component prior to installation in the range of use and thereby forms the basis for an optimal mode of operation that occurs as immediately as possible. In the simplest case, the storage occurs in a property memory storage unit assigned to the hydrodynamic component, it being possible to dispose this property memory storage unit either on the housing of the hydrodynamic component or in the hydrodynamic component.

The property memory storage unit itself can also include here, in addition to the storage of the characteristic diagrams, in particular the storage of the manipulated variable characteristic diagram, additional properties that are recorded during the final test or even later during operation of the hydrodynamic components as well. This property memory storage unit further includes a communication interface, by means of which it can be linked to a data communication network or a control device. During use in vehicles, the corresponding operating parameters that determine the characteristic diagram are then read out when the vehicle is first put into operation.

A further possibility consists in assigning a control device to the hydrodynamic retarder itself. The control device can be disposed either on the housing or in the housing of the hydrodynamic retarder. During operation, this control device serves for processing additional set values and actual values. Particularly during the final test, this possibility offers the advantage of dispensing with a separate control device and performing the actual matching of the characteristic curve already in the control device assigned to the hydrodynamic component. If only a single property memory storage unit is used, a separate control device for the corresponding processing of the characteristic diagram is required.

The hydrodynamic component preferably involves a hydrodynamic retarder, comprising a primary impeller in the form of a rotor blade wheel and a secondary blade wheel in the form of a fixed stator blade wheel or else of a blade wheel that rotates at a relative rpm in relation to the primary blade wheel. Further conceivable is the application of the inventive method also to the final testing of hydrodynamic couplings and of hydrodynamic rpm-torque converters. When it is used for the final test of hydrodynamic retarders, the characteristic curves characterizing the operating mode are incorporated by rpm/torque characteristic curves. Here, the rpm is determined by a variable that characterizes at least indirectly the rpm of the rotor blade wheel. The torque involves the braking torque $M_{braking}$ that can be produced. Depending on the desired braking power, this braking torque can be adjusted either stepwise or else continuously. In the first case mentioned, the characteristic diagram is composed of at least one characteristic curve and preferably of a plurality of individual characteristic curves assigned to the individual braking steps, whereas, in the other case, each operating point can be engaged between a pre-given maximal and minimal braking torque via the rpm, each individual operating point in the characteristic diagram also being assigned a corresponding manipulated variable that is to lead to the adjustment of this operating point.

According to a further development of the invention, a certain tolerance range is always given in advance for a certain characteristic diagram or a characteristic curve, it being possible to predefine these limiting values. The tolerance band, that is, the deviation above and below a characteristic curve, preferably amounts here to 20% of $M_{max}$.

The matching of the manipulated variable occurs during determination of a deviation of the variables characterizing the operating mode, preferably of such a variable in an operating point, by changing the manipulated variable by a correction value k, the change being performed during the next run through this operating point or else during each nth run through the same desired operating point. This correction value k can involve a fixed pre-given correction value, which is applied to the manipulated variable, but it can also involve a correction value that can be calculated or determined, it being possible in doing this to take into consideration functional relationships. In the simplest case, the correction value is a fixed quantity, which, in the event of deviation, is added to or subtracted from the currently used set value in order to adjust the current actual variables. According to an especially advantageous embodiment, a finer stepped sensing is possible in order to keep the correction value variable, calculated as a function of the value determined between two successive identical operating states during repeated runs through the same operating state. In this process, the manipulated variable $Y_{set}$ is determined, for example, from the product of the manipulated variable established during the last adjustment of the operating point and the quotient obtained from the currently determined actual torque and the actual torque of the operating parameters determined during the last adjustment of the operating point. If the operating parameters attainable with the new set variable value, in particular the corresponding characteristic values, continue to lie then in the tolerance range of the set characteristic values, the determined set manipulated variable is set as new set manipulated variable for this operating point.

According to an advantageous embodiment of the inventive method, when the set manipulated variable is stored, the respective tolerance occurring with it in deviation from the optimal state is also determined, that is, determined and likewise stored. Accordingly, there results a multidimensional characteristic diagram for the adjustment of the operating point, in which, in addition to the manipulated variable, also the deviation from the optimal state brought about with it in the individual operating steps is also recorded and thus the tolerance variable is available as an assessment criterion for further procedures.

BRIEF DESCRIPTION OF THE SEVERAL
VIEWS OF THE DRAWINGS

The inventive solution will be explained below on the basis of figures. Depicted therein in detail is the following:

DETAILED DESCRIPTION OF THE INVENTION

Figure 1:
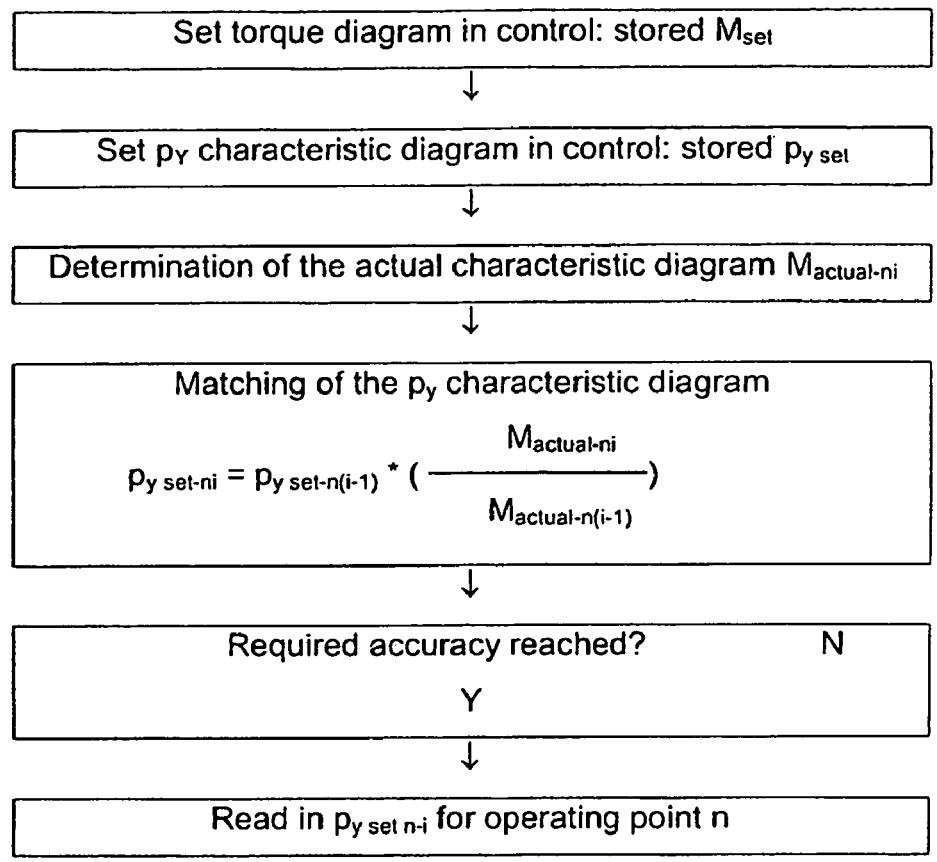
FIG. 1 illustrates, in a schematically simplified depiction based on a signal flow chart, an especially advantageous embodiment of the inventive method.
Figure 2:
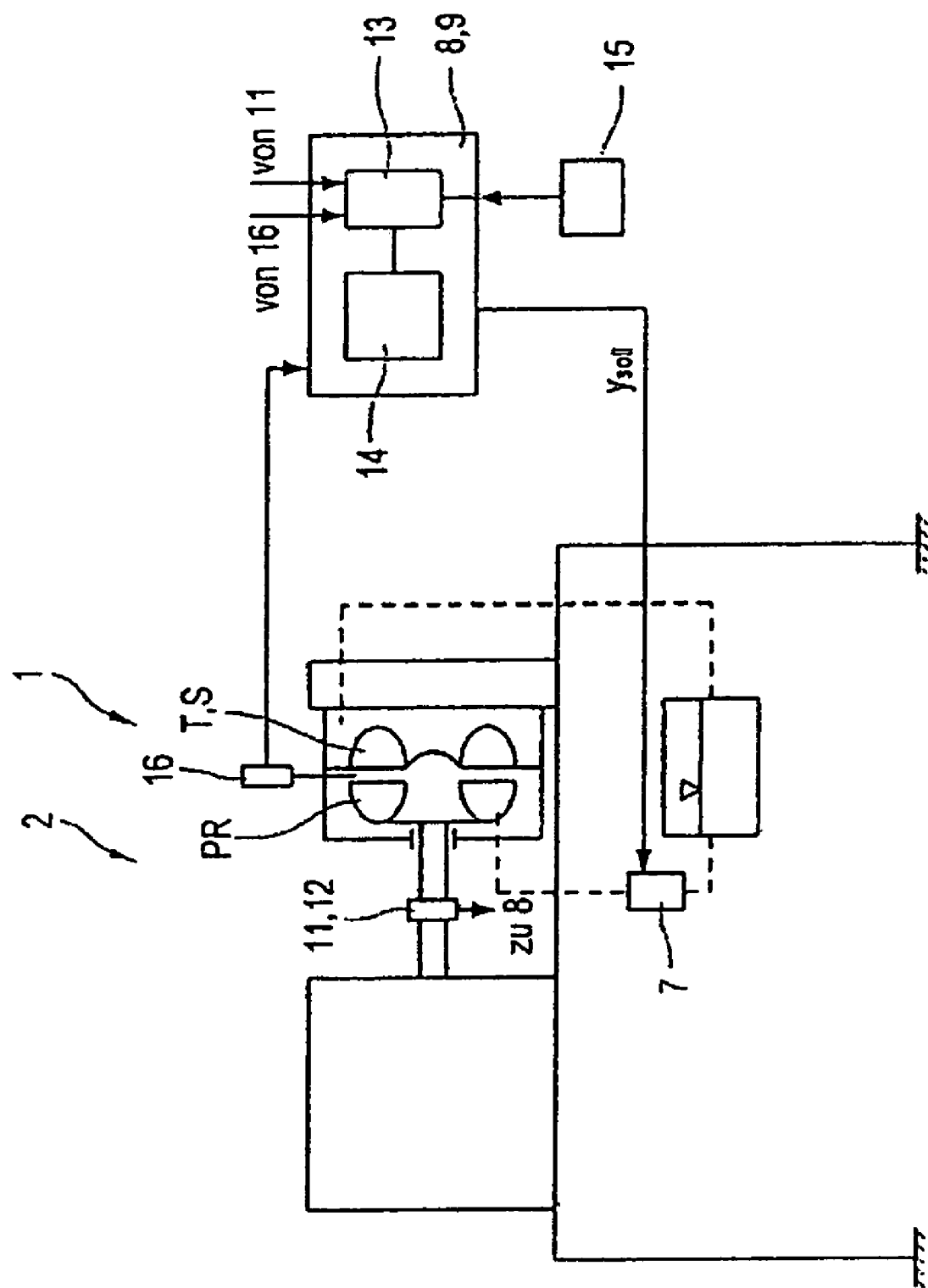
FIG. 2 illustrates, in a schematically simplified depiction, the basic layout of a test stand for implementing the inventive method.

FIG. 1 illustrates, in a schematically simplified depiction, the basic course of a method according to the invention for limiting the deviation of an actual characteristic curve or an actual characteristic diagram, which is realized with a hydrodynamic component and characterizes the operating mode, from a predefined or pre-given set characteristic curve or set characteristic diagram, which characterizes the operating mode, during the final test of the hydrodynamic component 1 in a test layout 2. The test layout 2 is represented in FIG. 2 in a schematically highly simplified depiction in terms of its functional assembly. Associated with the hydrodynamic component 1 is a working medium supply system 3, which is depicted here only by means of a broken line. Said working medium supply system can be designed in a variety of ways and it can be present even in a version fulfilling only a minimal function for the design on the test stand. Because the individual functional modes of the hydrodynamic component 1 are determined, as a rule, by the filling level (FL) existing in the working chamber 4 and/or the pressure ratios in the individual lines of the working medium supply system 3, a regulating device 7 is associated with the latter at least one inlet 5 and/or at least one outlet 6 out of the working chamber 4, it being possible also to design said regulating device in a variety of ways depending on the design and kind of influencing of the transmission behavior of the hydrodynamic component 1, preferably in the form a valve device. For adjustment of a desired transmission behavior, describing the operating mode, in the form of a predefined or pre-given set characteristic curve, the regulating device 7 is assigned a corresponding manipulated variable Y for each individual operating point of the set characteristic curve describing the operating mode. Said manipulated variable is represented either in a set characteristic curve for the manipulated variable Y, preferably in a set characteristic diagram for the manipulated variable $Y_{set}$ with assignment to a corresponding operating point of the predefined or pre-given set characteristic curve for the operating mode of the hydrodynamic component 1. The hydrodynamic component 1 depicted in FIG. 2 is designed as a hydrodynamic retarder. Said hydrodynamic retarder comprises a primary impeller P, functioning as a rotor blade wheel R, and a secondary impeller T, functioning as a stator blade impeller S. Here, the secondary impeller is stopped. For each individual hydrodynamic component 1, particularly for types of the same design and power, there exist predefined or pre-given set characteristic curves for the operating mode in the form, as a rule, of so-called rpm/torque characteristic curves (n-M characteristic curves). In order to attain these set characteristic curves, a corresponding manipulated variable $Y_{set\,1}$ to $Y_{set\,n}$ is assigned to each operating point, that is, to each arbitrary rpm. Here, the manipulated variable $Y_{set}$ is provided, depending on the currently existing operating conditions, via a control device 8, preferably in the form of a control instrument 9. The set characteristic curve or the set characteristic diagram for the manipulated variable $Y_{set}$ can be read out by the control device 8, depending on the assignment of the hydrodynamic component 1, also from a writable/readable memory storage unit 10 associated with the hydrodynamic component 1 and fed to the control device 8. The function of the control device, in particular the control device 8, can then be assumed by any control device assigned to a component in the drive train during use in vehicles or by the central driving control. Here, for the test layout 2, a device 15 for predetermining a desired braking torque and a recording device for recording a variable describing at least indirectly the actual rpm $n_{actual}$ of the primary impeller P of the hydrodynamic component 1 is provided in the form of a recording device 11. In the simplest case, said device can be assigned to the shaft linked to the primary impeller P. This recording device 11 is designed, for example, in the form of a sensor 12, which generates a signal for the control device 8. Corresponding to this signal, the manipulated variable $Y_{set}$ is determined from the set characteristic curve for a specific operating state of the hydrodynamic retarder stored in the control device 8 and is used for actuation of the regulating device 7. Here, for this specific rpm n, a specific torque value is adjusted at the hydrodynamic component 1 and is designated as $M_{actual}$. This variable or a variable characterizing this is also recorded at least directly, that is, directly or via functioning relations or proportionality, by means of, for example, a recording device 16 and is compared with the set characteristic diagram for the variables describing at least indirectly the operating mode, stored in the control device 8. If a deviation now exists, it is provided for in accordance with the invention that a matching of the manipulated variable $Y_{set}$ is performed for this operating point and thereby the predefined or pre-given set characteristic diagram or the individual characteristic curve is attained for the torque to be adjusted. In this process, the manipulated variable $Y_{set}$ is changed for this operating point. This change can occur in different ways. In the simplest case, a respective matching by a correction value can be performed here and this correction value can be readjusted each time for each new adjustment of the operating point. Preferably, this procedural mode is chosen for a majority of operating points, preferably in specific intervals, such as, for example, rpm intervals, or else is chosen for all operating points. In the latter case, the entire operating range, which is determined, for example, by an rpm range, is run through respectively. Another possibility consists in determining anew the manipulated variable in the form of a functional relation. In this regard, there also exist several possibilities. In the simplest case, the variables of preceding runs through the operating range for identical operating points already determined without anything further, that is, the determined actual values, are used. FIG. 1 addresses in more detail one possibility in this regard. This matching is also performed in the control device 8 in the simplest case. Said control device comprises to this end, in addition, at least one-comparison device 13 as well as a set value correction device 14. This operation is repeated until a required accuracy is achieved. This can occur, for example, through predetermination of a tolerance band for a certain set characteristic curve that can be described for the operating mode of the hydrodynamic component 1. Conceivable here is to lay the tolerance band equally over the entire characteristic curve or else to allow greater deviations in individual ranges.

If the required accuracy is reached, the set value $Y_{set-new}$ for the individual manipulated variable Y, matched for the individual operating points, respectively, can be stored, this set variable characteristic diagram for the manipulated variable being then assigned as well to the hydrodynamic component 1 and it being possible to use it for any x arbitrary control.

FIG. 1 illustrates, again on the basis of a signal flow chart, the basic principle of the inventive method for matching an actual characteristic curve that characterizes the operating mode of a hydrodynamic component 1 to a pre-given or predefined set characteristic curve during the final test of the hydrodynamic component 1 for the purpose of adjusting, in the later range of use, an operating mode in the range of the desired set characteristic curve. For this purpose, for a certain type of a hydrodynamic component 1—for example, a hydrodynamic retarder of certain design type and design size—a set characteristic diagram, which describes the operating mode of the hydrodynamic component 1, is stored in the control 8 and, further, a corresponding set manipulated variable characteristic diagram. The set characteristic diagram describing the operating mode involves, for example, a set torque diagram, the torque for the retarder being characterized by the braking torque. The individual torques over the entire operating range are designated here as $M_{set\,1}$ to $M_{set\,n}$. Assigned to each operating point, particularly the set torque in the torque characteristic diagram is a corresponding manipulated variable Y, preferably in the form of an adjusted pressure $p_Y$ for hydrodynamic components. The set manipulated variable characteristic diagram resulting from this for $p_{Y\,set}$ consists here of a plurality of individual manipulated variables $p_{Y\,set\,1}$ to $p_{Y\,set\,n}$. Preferably, the correlation among these is made via an rpm n. The set torque characteristic diagram for $M_{set\,1}$ to $M_{set\,n}$ is stored here in an rpm/torque diagram. In this process, the individual characteristic diagram can be predetermined through a plurality of individual characteristic curves. Preferably, the correlation occurs via the rpm n at the primary impeller P of the hydrodynamic component 1, which, depending on the design of the hydrodynamic component as a hydrodynamic coupling, an rpm/torque converter, or a hydrodynamic retarder, is designed as a pump wheel or as a rotor blade wheel. These two characteristic diagrams—the set torque characteristic diagram $M_{set}$ and the set manipulated variable characteristic diagram $p_{Y\,set}$—constitute here the starting point. On the test stand during the final test, then, the current actual torque characteristic diagram $M_{actual}$ is determined, wherein a plurality of individual torque characteristic values $M_{actual\,1}$ to $M_{actual\,n}$ are determined, which, for example, in relation to the rpm at the primary impeller, map the individual operating points in the torque characteristic diagram. On the basis of a comparison of the determined actual value—in the case depicted, the torque $M_{actual}$—with the set value $M_{set}$ in the respective operating point, it is determined whether this operating point corresponds to the desired set value according to the set torque characteristic diagram. If the comparison results in the set value $M_{set}$ for a specific operating point being exceeded or not reached by $M_{actual-i}$, then the manipulated variable is correspondingly matched—for example, decreased in the case depicted, whereas, in the case of a value that is too low, a change in the manipulated variable $Y_{set\,n}$ in the direction of an increase occurs. In this regard, the manipulated variable Y—in the case depicted, $p_{y\,set}$—can be changed only by addition or subtraction by a correction value, which can be fixed beforehand, freely defined, or determined. Another possibility corresponding to the embodiment according to FIG. 1 consists in creating here a functional relation, particularly between individual operating points ($n_{actual\,n}$, $M_{actual\,n}$) to be engaged for theoretically identical ones in the set characteristic diagram as well as changes in the manipulated variables $p_{Y\,set}$. Here, for example, for a specific operating point, which is characterized by a specific torque $M_{actual-n}$ and can be adjusted via the manipulated variable $p_{Y\,set\,n}$, the successively determined values for two identical operating points to be adjusted ($n_{actual\,n}$, $M_{actual\,n}$) are taken into consideration during repeated runs through the entire operating range. This results in the manipulated variable $p_{Y\,set\,new}$ to be used anew from the product of the currently applied regulating pressure $p_{Y\,set\,n-(i-1)}$, which corresponds to the pre-given set value $P_{Y\,set}$ from the last adjustment of the same operating point ($n_{actual\,n}$, $M_{actual,\,n}$), and the quotient obtained from the current torque $M_{actual\,n(i-1)}$ from the last determination in the same operating point. If the required accuracy is still not yet reached, then the correction is performed further, that is, repeated during the next runs through the operating point n. Here, n characterizes a concrete operating point; i represents the number of the repeated adjustment of the operating point n. If, however, the then existing actual torque $M_{actual\,n-i}$ then lies in the tolerance range, the value of the manipulated variable $p_{Y\,set\,n-i}$ used for it can be read in for this operating point n. The latter then becomes $p_{Y\,set\,new}$. Preferably, a plurality of such iteration steps always takes place. In this process, for each operating point n, this iteration is performed always in relation to the operating point. This means that, assuming, for example, a certain filling level at a certain rpm $n_2$, one starts with a set value for the manipulated value $p_{Y\,set}$ at rpm $n_2$ and torque $M_{set}$ to be adjusted at $n_2$ and the current torque $M_{actual\,2}$ is determined at $n_2$. If $M_{actual\,2}$ deviates from the set value $M_{set\,2}$ at rpm $n_2$ to be in reality adjusted theoretically, the correction of the manipulated variable $p_{Y\,set\,2}$ results at rpm $n_2$ and $M_{set\,2}$ for rpm $n_2$. In this process, the set value for the manipulated variable $p_{Y\,set\,2}$ is determined anew by determining it from the product of $p_{Y\,actual\,2}$ at rpm $n_2$ and the quotient of the current actual torque $M_{actual\,2}$ at rpm $n_2$ and the last measurement $M_{actual\,2-(1)}$ at rpm $n_2$. Then, if the required accuracy is not reached, this new set value can be read in as a fixed predetermined set value for the specific operating point n.

Figure 3A:
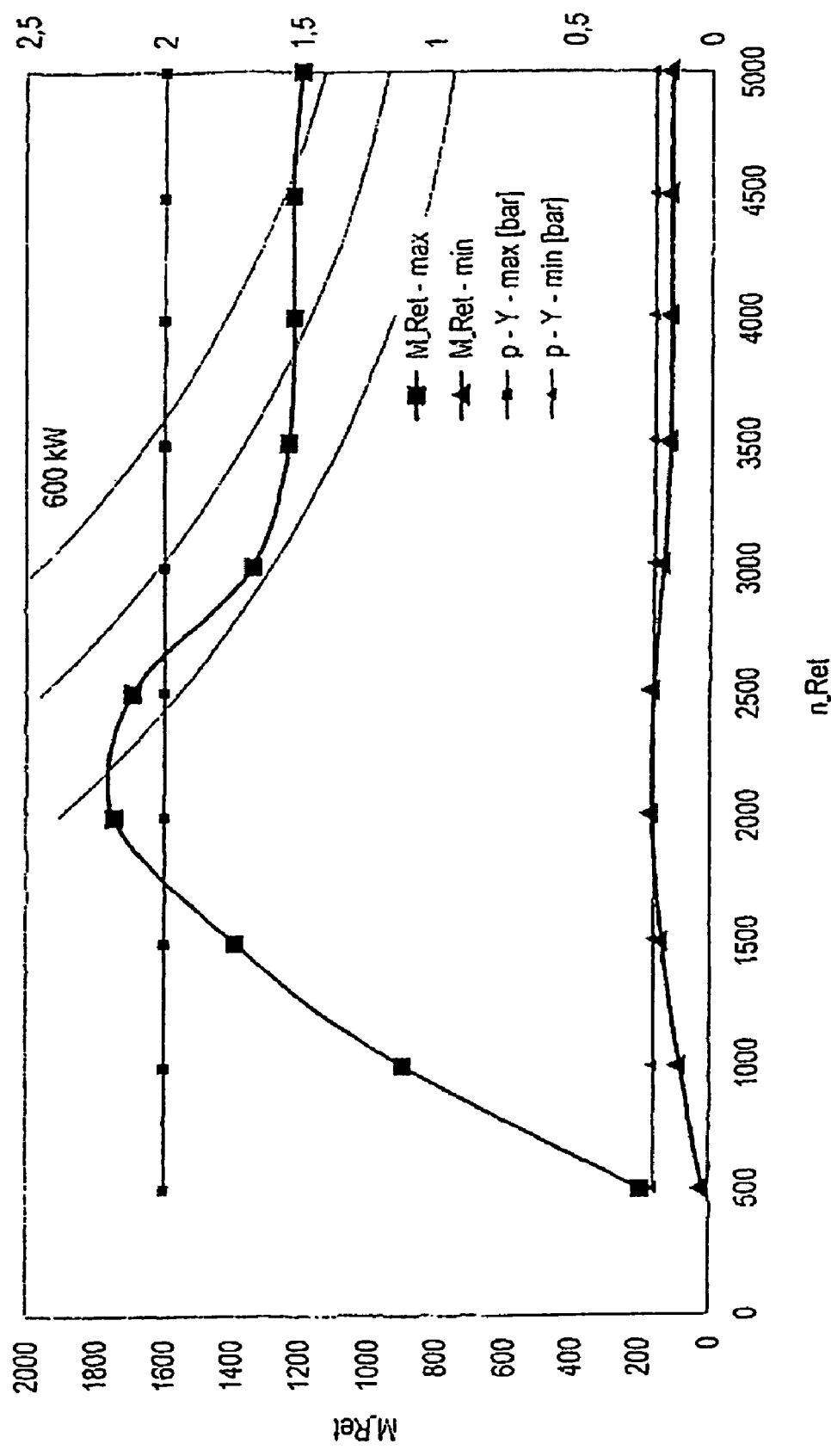
FIG. 3a illustrates, on the basis of an rpm/torque diagram, the pre-given set characteristic diagram for a hydrodynamic retarder.
Figure 3B:
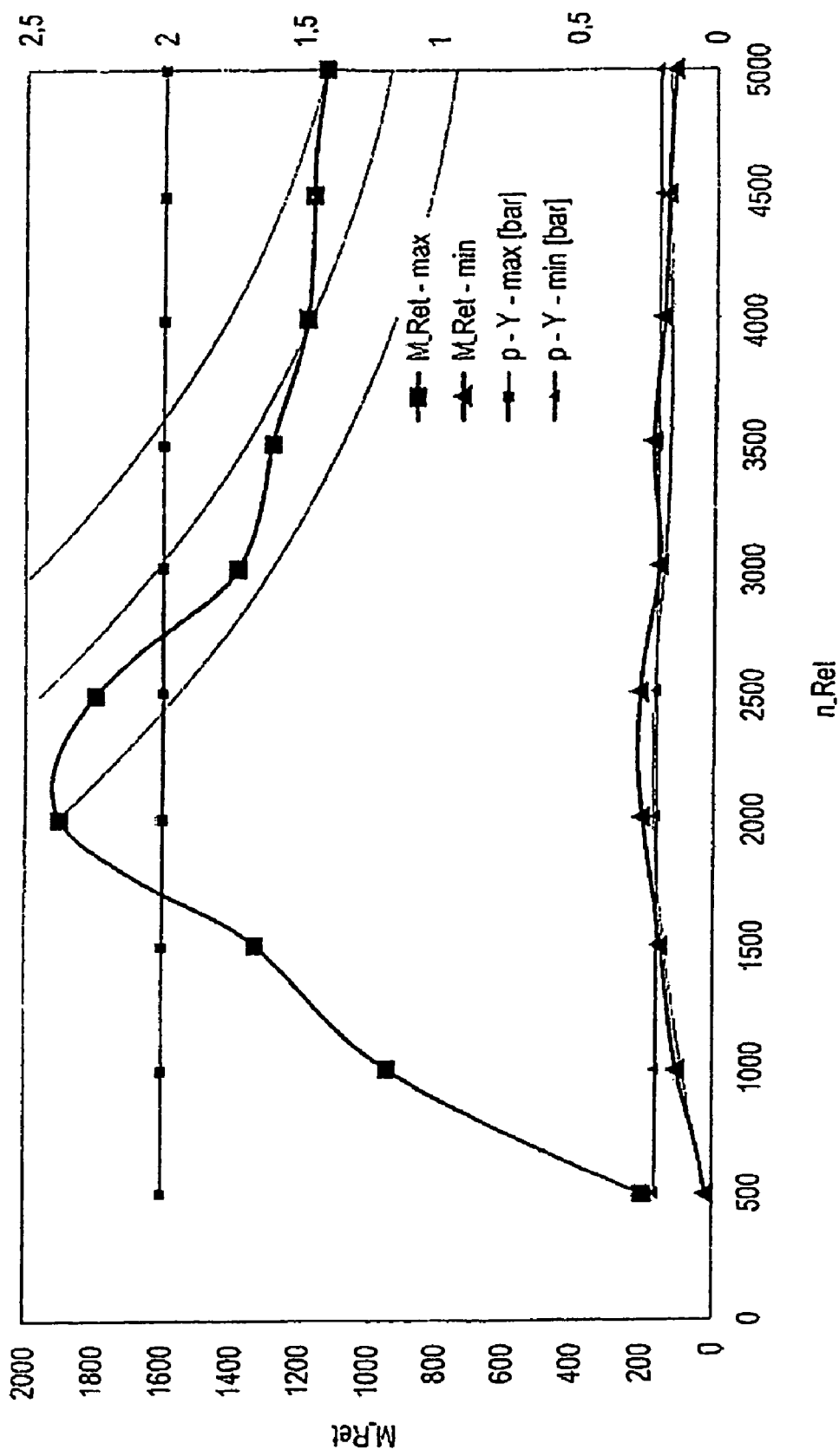
FIG. 3b illustrates the actual characteristic diagram of a hydrodynamic retarder determined during a run through the operating range.
Figure 3C:
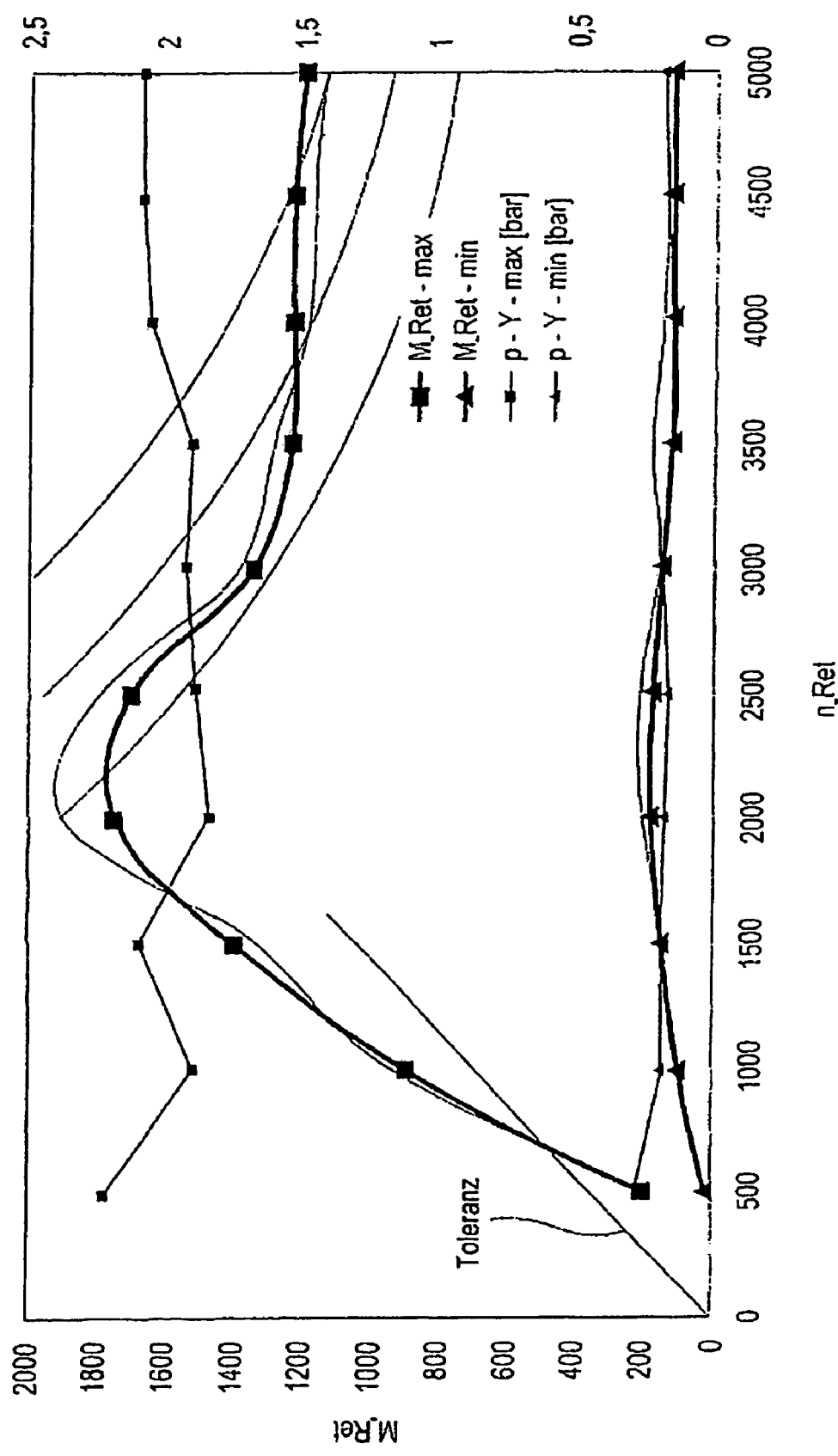
FIG. 3c illustrates the existing characteristic diagram for the hydrodynamic retarder, corrected according to the inventive method, with additional optional recording of the variable for the tolerance deviation.

FIGS. 3a to 3c illustrate, by way of example, the application of the inventive method in a hydrodynamic retarder, comprising a primary impeller in the form of a rotor blade wheel and a secondary blade wheel. Represented in FIG. 3a is the set characteristic diagram for the hydrodynamic retarder on which the final testing is based. It is evident from it that, here, essentially two retarder characteristic curves are distinguished, which describe the production of a maximum braking torque $M_{Ret-max}$ and $M_{Ret-min}$. This is also always dependent on the filling level FL of the hydrodynamic retarder or even on the desired braking step engaged, so that, besides the two different characteristic curves depicted here, also a plurality of such characteristic curves can be predetermined. Assigned to each of these characteristic curves, which are designated here as $M_{Ret-max}$ and $M_{Ret-min}$ is a corresponding manipulated variable characteristic curve, which, in accordance therewith, is designated as $p_{Y\,max}$ and $p_{Y\,min}$. The characteristic curves are represented in the so-called rpm/torque characteristic diagram (n/M diagram). The rpm n is described, for example, by the rpm of the retarder, in particular the rotor blade wheel R.

In contrast to this, FIG. 3b reveals the true actual characteristic diagram, as it results on application of the manipulated variable $p_{Y\,set}$ for the individual operating points. It is evident from this that there are indeed substantial deviations in certain regions of each individual actual characteristic curve from the so-called set characteristic curves. The correction occurs via matching of the manipulated variable $p_{Y\,set}$—here, in the concrete case, both of the manipulated variables $p_{y\,max}$ and $p_{Y\,min}$—the correction being performed for each individual operating point. This holds true in analogy also for the minimum braking torque $M_{Ret-min}$ that can be produced by the retarder.

The reading in of the corrected manipulated variables $p_{Y\,set}$ anew for the individual operating points n occurs here at least in a writable/readable memory storage unit. This can be attached to the hydrodynamic component 1, particularly the hydrodynamic retarder—for example, it can be attached to the housing. It is also conceivable to read in the corrected set characteristic diagram $p_{Y\ set}$, resulting from a plurality of these individual set manipulated variable values, into the hydrodynamic component 1, in particular into control device 8 assigned to the hydrodynamic retarder.

Additionally plotted are, by way of example, the actual deviations of the adjusted actual operating points when the stored set manipulated variables are used. This deviation can be employed as an additional evaluation criterion for subsequent control processes in the operation of the hydrodynamic components.

The inventive solution is not limited to the possibility of changing the manipulated variable $p_{Y set}$ described here. Conceivable, as already discussed, is a stepwise change by a specific predefined or pre-given correction value. This correction value can be calculated or else freely set. This depends, in particular, also on the interval at which such corrections are to occur. The correction can occur during successive runs through the specific operating point or else only at each ith adjustment of the operating point n.

LIST OF REFERENCE NUMBERS 1 hydrodynamic component
2 test layout
3 working medium supply system
4 working chamber
5 inlet
6 outlet
7 regulating device
8 control device
9 control instrument
10 memory storage unit
11 recording device
12 sensor
13 comparison device
14 set value correction device
15 device for predetermination of a desired braking torque
16 device for recording a variable describing the actual torque, at least indirectly

The invention claimed is:

1. A computer-implemented method for matching an actual characteristic curve or diagram of a hydrodynamic component to a set characteristic curve or diagram during the final test of the hydrodynamic component, comprising:
   assigning a writable/readable memory storage unit to the hydrodynamic component;
   storing at least one set characteristic curve or diagram that describes the desired operating mode of the hydrodynamic component in the memory storage unit;
   assigning a set manipulated variable ($Y_{set\ n}$) to each operating point (n) contained in said at least one set characteristic curve or diagram;
   determining a current actual characteristic curve or diagram from operating parameters characterizing a current operating state; and
   comparing each operating point (n) of the current actual characteristic curve or diagram with those of the set characteristic curve or diagram,
   wherein, in the event of a deviation outside of a tolerance range that can be preset for repeated actuation of the operating point (n), a correction of the set manipulated variable ($Y_{set}$) for the respective operating point (n) is performed until the operating point lies in the tolerance range, and
   wherein, in the event of a deviation inside of the tolerance range or agreement of the current value, the set manipulated variable is set as the new set value and read into the memory storage unit as the final value for the set manipulated variable ($Y_{set\ new}$) for each operating point (n).

2. The computer-implemented method according to claim 1, wherein the change of the set manipulated variable ($Y_{set\ n}$) occurs for a specific operating point by a correction value k.

3. The computer-implemented method according to claim 2, wherein the correction value k can be predefined or can be calculated.

4. The computer-implemented method according to claim 1, wherein the change in a set manipulated variable ($Y_{set\ n}$) assigned to an operating point is determined by calculation from previously determined actual variables for the same operating point (n).

5. The computer-implemented method according to claim 1, wherein the change in the set manipulated variable ($Y_{set}$) occurs for each run through the operating point (n).

6. The computer-implemented method according to claim 1, wherein the change in the set manipulated variable ($Y_{set}$) occurs for each nth run through the operating point (n), n being greater than 1.

7. The computer-implemented method according to claim 1, wherein the actual and set characteristic curves of the hydrodynamic component are formed by rpm/torque characteristic curves (n, M).

8. The computer-implemented method according to claim 1, wherein the manipulated variables ($Y_{set}$) required for adjustment of the operating points (n) are formed by a control pressure ($p_{y\ set}$), which serves for application to a regulating device.

9. The computer-implemented method according to claim 8, wherein the changed set manipulated variable results from the following relation:

$$p_{Y\ set\ ln-i} = p_{Y\ set\ ln(i-1)} \times \left( \frac{M_{actual\ n-i}}{M_{actual\ n-(i-1)}} \right)$$

with $P_{y\ set\ n-i\ new\ set}$ manipulated variable, which, in the event of a deviation during current adjustment of the actual value, $M_{actual\ n-i}$ from the pre-given set value $M_{set\ n}$ as the set value to be set for the manipulated variable during the next activation of the operating point (n), $P_{y\ set\ n-(i-1)}$ set manipulated variable used for the adjustment of $M_{actual\ n-i}$ determined as for operating point (n) during the last adjustment, $M_{actual\ n-i}$ is the current actual value, which was adjusted with $P_{y\ set\ n-(i-1)}$, and $M_{actual\ n-(i-1)}$ actual value that was determined during the last adjustment of the operating point (n).

10. The computer-implemented method according to claim 1, wherein the tolerance range is chosen in relation to a characteristic curve uniformly over the entire characteristic curve or diagram.

11. The computer-implemented method according to claim 1, wherein for each operating point determined with the stored set manipulated value, the magnitude of the deviation of the respective actual parameter that describes the operating point form the theoretically adjustable set value, that is, the magnitude of the tolerance, is recorded and stored.

* * * * *